(12) United States Patent
Paris

(10) Patent No.: US 9,038,453 B2
(45) Date of Patent: May 26, 2015

(54) METHODS AND APPARATUS TO DETERMINE AIRCRAFT FLIGHT CONDITIONS

(71) Applicant: The Boeing Company, Chicago, IL (US)

(72) Inventor: Stephen W. Paris, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/889,030

(22) Filed: May 7, 2013

(65) Prior Publication Data

US 2014/0331760 A1    Nov. 13, 2014

(51) Int. Cl.
| G01P 13/00 | (2006.01) |
| G01P 5/26 | (2006.01) |
| G01P 5/00 | (2006.01) |
| G01P 5/18 | (2006.01) |
| G01P 13/02 | (2006.01) |
| G01K 5/28 | (2006.01) |

(52) U.S. Cl.
CPC . *G01P 5/26* (2013.01); *G01P 5/005* (2013.01); *G01P 5/18* (2013.01); *G01P 13/025* (2013.01); *G01K 5/28* (2013.01)

(58) Field of Classification Search
USPC ...................................................... 73/170.02
See application file for complete search history.

(56) References Cited

U.S. PATENT DOCUMENTS

| 2,827,786 | A | | 3/1958 | Boyd et al. |
| 5,002,389 | A | | 3/1991 | Benser |
| 6,490,510 | B1 | * | 12/2002 | Choisnet .......................... 701/14 |
| 6,662,647 | B2 | * | 12/2003 | Schoess et al. ............. 73/170.02 |
| 7,003,873 | B2 | * | 2/2006 | Schoess et al. ................. 29/832 |
| 7,275,013 | B1 | * | 9/2007 | Matlis et al. ................... 702/144 |
| 7,380,756 | B1 | | 6/2008 | Enloe et al. |
| 7,624,941 | B1 | | 12/2009 | Patel et al. |
| 7,908,115 | B2 | | 3/2011 | Matlis et al. |
| 7,954,768 | B1 | | 6/2011 | Patel et al. |
| 8,091,950 | B2 | | 1/2012 | Corke et al. |
| 8,185,349 | B2 | | 5/2012 | Matlis et al. |
| 8,256,284 | B2 | * | 9/2012 | Vozhdaev et al. .......... 73/170.02 |
| 8,267,355 | B1 | | 9/2012 | Patel et al. |
| 8,308,112 | B2 | | 11/2012 | Wood et al. |
| 8,714,006 | B2 | * | 5/2014 | Wagner et al. ............. 73/170.02 |
| 2007/0022807 | A1 | * | 2/2007 | Miller et al. ............... 73/170.02 |

FOREIGN PATENT DOCUMENTS

| DE | 19957808 | 6/2001 |
| EP | 0374822 | 6/1990 |
| GB | 1591216 | 6/1981 |

OTHER PUBLICATIONS

European Patent Office, "Extended European Search Report", Issued in connection with application No. EP14158733.7, on Jul. 10, 2014, 8 pages.

\* cited by examiner

*Primary Examiner* — Andre Allen
(74) *Attorney, Agent, or Firm* — Hanley, Flight & Zimmerman, LLC

(57) ABSTRACT

Methods and apparatus to determine aircraft flight conditions are disclosed herein. An example apparatus disclosed herein includes a gaseous packet generator to generate a gaseous packet adjacent an aircraft. The example apparatus also includes a sensor array disposed on the aircraft to acquire information related to the gaseous packet. The example apparatus further includes a processor to determine at least one of a first characteristic of air flowing along the aircraft or a second characteristic of the aircraft based on the information.

22 Claims, 9 Drawing Sheets

METHODS AND APPARATUS TO DETERMINE AIRCRAFT FLIGHT CONDITIONS

FIELD

The present disclosure relates generally to aircraft flight monitoring systems and, more particularly, to methods and apparatus to determine aircraft flight conditions.

BACKGROUND

Generally, an aircraft includes an airspeed indicator to enable a pilot operating the aircraft to monitor an airspeed of the aircraft. Traditional airspeed indicators often include pressure probes and/or vanes extending from an aerodynamic surface of the aircraft. As a result, the indicators may be damaged and/or rendered inoperative and/or inaccurate if debris (e.g., ice, dirt, birds, precipitation, etc.) and/or ground crew equipment collide with and/or block the probes and/or the vanes. Traditional airspeed indicators generally include one or more moving parts such as, for example, a diaphragm, springs, a rocker, a pinion, and/or other moving parts. These moving parts may be break or fail and/or require frequent maintenance and/or replacement.

SUMMARY

An example apparatus disclosed herein includes a gaseous packet generator to generate a gaseous packet adjacent an aircraft. The example apparatus also includes a sensor array disposed on the aircraft to acquire information related to the gaseous packet. The example apparatus further includes a processor to determine at least one of a first characteristic of air flowing along the aircraft or a second characteristic of the aircraft based on the information.

An example method disclosed herein includes generating a gaseous packet adjacent an aircraft. The gaseous packet is to move relative to the aircraft. The example method further includes determining a first characteristic of the gaseous packet and determining at least one of a second characteristic of air flowing along the aircraft or a third characteristic of the aircraft based on the first characteristic of the gaseous packet.

Another example apparatus includes means for generating a gaseous packet adjacent an aircraft and means for detecting the gaseous packet as the gaseous packet moves relative to the aircraft. The example apparatus also includes means for determining at least one of a first characteristic of air flowing along the aircraft or a second characteristic of the aircraft based on detection of the gaseous packet.

Figure 1:
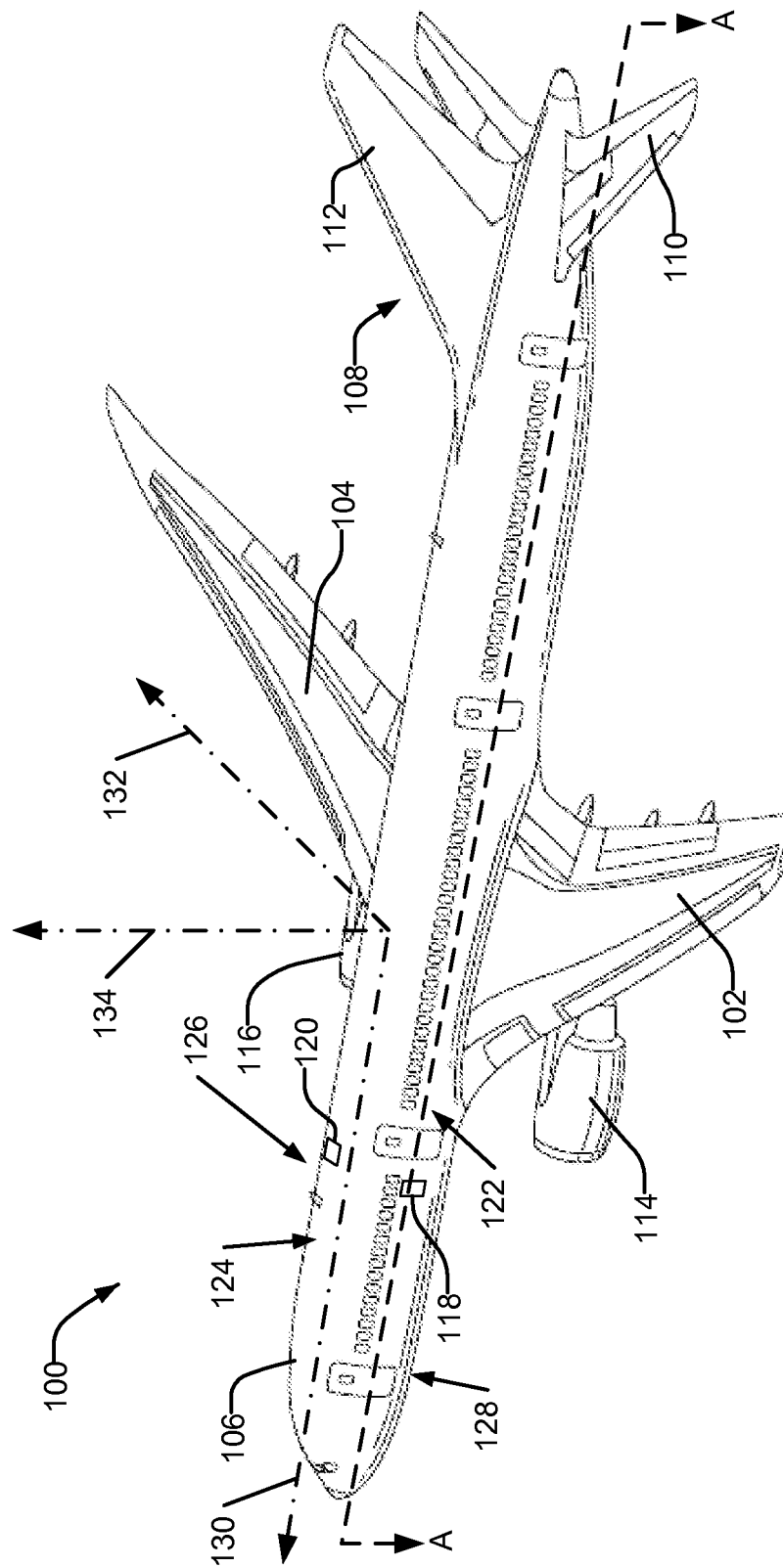
FIG. 1 is a perspective view of an example aircraft that may be used to implement the examples disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Methods and apparatus to determine aircraft flight conditions are disclosed herein. An example apparatus disclosed herein includes a gaseous packet generator (e.g., a laser, a sparkplug, etc.) and a sensor array aft of the gaseous packet generator. In some examples, the gaseous packet generator and/or the sensor array do not include moving components and, thus, are solid state devices. In some examples, the gaseous packet generator is disposed inside the aircraft and generates a gaseous packet (e.g., a puff of smoke, a plasma packet, and/or any other gaseous packet) outside the aircraft. For example, a laser beam generated by the gaseous packet generator may be directed from inside the aircraft to outside the aircraft via one or more optical fibers. In some examples, the gaseous packet generator does not interrupt or obstruct an airfoil of the aircraft. For example, the optical fibers may direct the laser pulse through an optical window that is substantially flush to an outboard or aerodynamic surface of the aircraft.

As the gaseous packet moves relative to the aircraft, the sensor array detects the gaseous packet at one or more locations along the sensor array. In some examples, the sensor array includes one or more sensors coupled to the aerodynamic surface of the aircraft to be substantially flush with the aerodynamic surface. In some examples, the sensors are disposed in a pattern (e.g., an arc-shaped pattern) to enable the sensor array to detect the gaseous packet if the gaseous packet moves in a first direction (e.g., aft relative to the aircraft) and a second direction (e.g., sideways, upwards, and/or downwards relative to the aircraft).

The example apparatus also includes a processor to determine one or more aircraft flight conditions such as, for example, an airspeed of the aircraft, an angle of attack of the aircraft, a velocity of air flowing along the aircraft (e.g., an updraft, a downdraft, and/or a sidedraft), a temperature of the air and/or other flight conditions. For example, based on an amount of time between generation of the gaseous packet at a first location (e.g., adjacent the optical window) and detection of the gaseous packet at a second location (e.g., along the sensor array), the processor determines a velocity of the gaseous packet. Based on the velocity of the gaseous packet, the airspeed of the aircraft may be determined. In some examples, based on a first directional component and/or a second directional component of the velocity of the gaseous packet, the processor determines a speed and/or direction of the air flowing along the aircraft (e.g., a velocity of an updraft, a downdraft and/or a sidedraft). In some examples, the processor determines a size or dimension of the gaseous packet and, based on the size, determines a temperature of the air. In some examples, based on one or more of the flight conditions, a flight control mechanism (e.g., a spoiler, flap, trim, engine, and/or other flight control mechanism) is adjusted. For example, based on a velocity of the air flowing along the aircraft, one or more flight control mechanisms may be adjusted to decrease and/or minimize turbulence and/or slip of the aircraft.

FIG. 1 is a perspective view of an example aircraft 100 in which aspects of the present disclosure may be implemented. The example aircraft 100 of FIG. 1 includes a first wing 102, a second wing 104 and a fuselage 106. The example aircraft 100 also includes an empennage 108 having a horizontal stabilizer 110 and a vertical stabilizer 112. In the illustrated example, a first cowling 114 is coupled to the first wing 102. A second cowling 116 is coupled to the second wing 104. The aircraft 100 of FIG. 1 is merely an example and, thus, other aircrafts may be used without departing from the scope of this disclosure.

In the illustrated example, the aircraft 100 includes a first sensor array 118 and a second sensor array 120. Other examples include other numbers of sensor arrays (e.g., 1, 3, 4, etc.). The example first sensor array 118 and/or the example second sensor array 120 detect and/or acquire information related to gaseous packets adjacent the aircraft 100 to enable one or more flight conditions (e.g., an airspeed, an angle of attack, a velocity of air flowing along the aircraft 100, a temperature of the air, and/or other flight conditions) to be determined. A gaseous packet is a gaseous substance or composition of substances, particles and/or materials having a pattern of movement and/or a shape for a given period of time. Example gaseous packets that may be generated and used in accordance with the teachings of this disclosure include a ball, puff and/or stream of smoke, plasma, and/or any other gaseous packet. In the illustrated example, the first sensor array 118 and the second sensor array 120 are coupled to the fuselage 106 fore of the first wing 102 and the second wing 104. The example first sensor array 118 is disposed on a left side 122 of the fuselage 106. The example second sensor array 120 is disposed on an upper side 124 (e.g., a roof) of the fuselage 106. In some examples, the first sensor array 118 and/or the second sensor array 120 are disposed on other portions of the fuselage 106 such as, for example, aft, over and/or under of the first wing 102 and/or the second wing 104, on a right side 126 of the fuselage 106, on a lower side 128 of the fuselage 106, and/or on any other portion of the fuselage 106. In some examples, the first sensor array 118 and/or the second sensor array 120 are disposed on other portions of the aircraft 100 such as, for example, the first wing 102, the second wing 104, the first cowling 114, the second cowling 116, the empennage 108 and/or any other portion of the aircraft 100.

During flight, the example aircraft may rotate about a roll axis 130, a pitch axis 132 and/or a yaw axis 134. For example, the aircraft 100 may rotate about the pitch axis 132 to enable the aircraft to ascend or descend.

Figure 2:
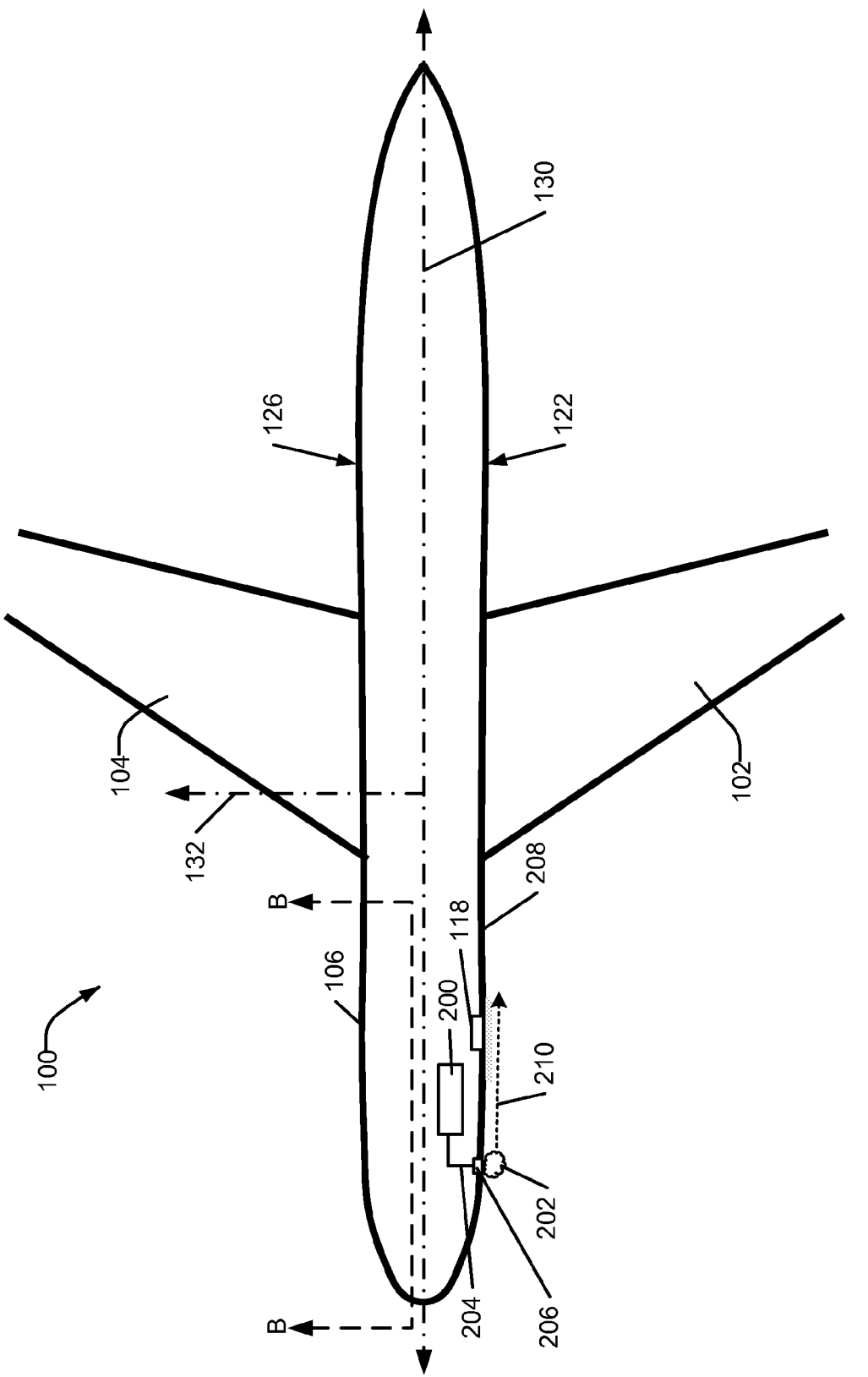
FIG. 2 is a cross-sectional view of the example aircraft of FIG. 1 along line A-A of FIG. 1 illustrating a first example ionizer generating a first gaseous packet adjacent the aircraft.

FIG. 2 is a schematic, cross-sectional top view of the example aircraft 100 along line A-A of FIG. 1. The schematic of FIG. 2 is not to scale. In the illustrated example, a first laser 200 (e.g., a solid state laser, a diode laser and/or any other laser) is disposed inside the example fuselage 106. In the illustrated example, the first laser 200 produces and/or outputs a laser beam that ionizes air outside or outboard of the aircraft 100 adjacent the fuselage 102 to form a first plasma packet 202. For example, when the laser beam interacts with the air adjacent the fuselage 102, the laser beam rapidly heats the air. As a result, the air ionizes (e.g., a number of electrons in atoms or molecules of the air increases or decreases) and transforms into a plasma. The plasma is electrically conductive and/or magnetized. As a result, constituent components of the plasma and/or particles and/or substances near the plasma interact by moving together and/or in a pattern (e.g., a wave) and/or by forming and/or preserving a shape (e.g., a ball), thereby generating the first plasma packet 202. In some examples, the first laser 200 is pulsed (e.g., the first laser 200 periodically outputs a laser beam for a given period of time) to generate the first plasma packet 202 and/or a plurality of other plasma packets. In the illustrated example, the first plasma packet 202 is a puff or ball of plasma. In other examples, the first plasma packet 202 is other shapes.

In other examples, other ionizers are used to generate the first plasma packet 202. For example, one or more spark plugs may be employed to ionize the air to generate the first plasma packet 202. In other examples, other types of gaseous packets are generated. For example, the aircraft 100 may include a smoke generator to generate and/or emit puffs of smoke.

In the illustrated example, a first fiber bundle 204 directs the laser beam output by the first laser 200 from inside the fuselage 102 through a first optical window 206 to outside the aircraft 100. The example first fiber bundle 204 includes one or more optical fibers. In some examples, optics (e.g., lenses, filters and/or any other optics) direct and/or focus the laser beam from the first laser 200 onto the first fiber bundle 204 and/or from the first fiber bundle 204 through the first window 206. In the illustrated example, the first window 206 is substantially flush with a first aerodynamic surface 208 (e.g., a skin) of the fuselage 102. An aerodynamic surface is a surface of the aircraft 100 interacting and/or in contact with air flowing along the aircraft 100. Some examples do not include the first window 206. For example, the laser beam may be output via an aperture or opening of the first aerodynamic surface 208.

The example first sensor array 118 is disposed aft of the first window 206 along a first path 210 of the first plasma packet 202. The example first sensor array 118 of FIG. 2 detects the first plasma packet 202 as the first plasma packet 202 moves relative to the aircraft 100. In some examples, the first plasma packet 202 is within a sensing range of the first sensor array 118 when the first plasma packet 202 contacts the first sensor array 118 and/or is in proximity to the first sensor array 118 (e.g., when the first plasma packet 202 is within a given distance from the first sensor array 118). In the illustrated example, the first sensor array 118 is disposed on the example aircraft 100 such that the first sensor array 118 is substantially flush with the first aerodynamic surface 208 of the fuselage 102. In the illustrated example, the first sensor array 118 is disposed about ten centimeters from the first window 206 and, thus, a location (e.g., a point or area) at which the first plasma packet 202 is generated. In other examples, the first sensor array 118 is other distances from the first window 206 and/or the location at which the first plasma packet 202 is generated.

In some examples, the first sensor array 118 includes one or more electromagnetic sensors to detect the first plasma packet 202. For example, the first sensor array 118 may include one or more capacitive sensors to detect the first plasma packet 202 by sensing a change in capacitance between the capacitive sensor(s) and the first plasma packet 202. In some examples, the first sensor array 118 includes one or more microphones to detect the first plasma packet 202 by sensing a sonic wave generated by the first plasma packet 202. The above-noted sensors are merely examples and, thus, other sensors may be used without departing from the scope of this disclosure. As described in greater detail below, the example first sensor array 118 is used to determine one or more characteristic of the first plasma packet 202 such as, for example, a velocity of the first plasma packet 202, a direction of movement of the first plasma packet 202, a size of the first plasma packet 202 and/or any other characteristic.

Figure 3:
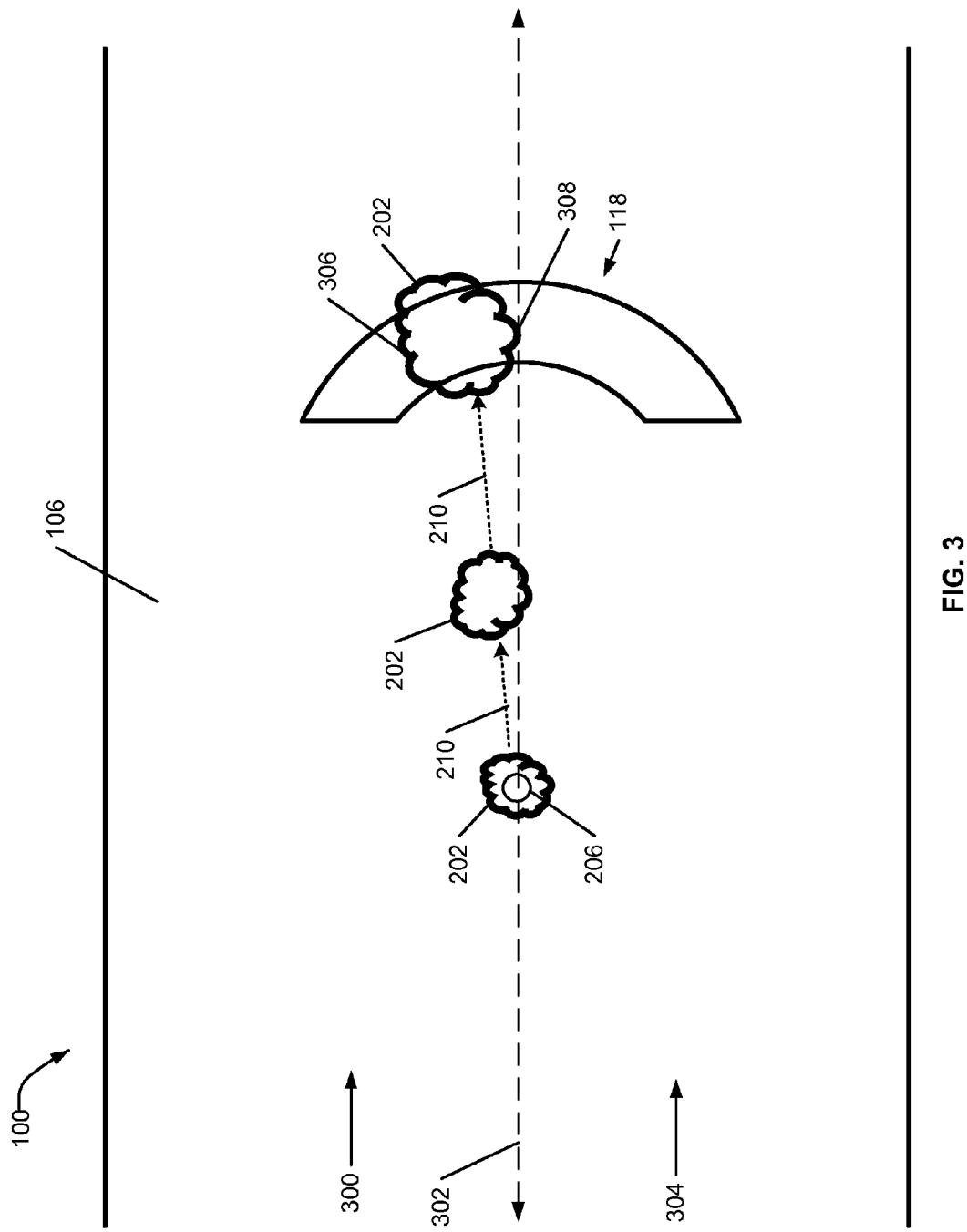
FIG. 3 illustrates an example first path of the first gaseous packet of FIG. 2 across a first example sensor array disclosed herein.

FIG. 3 is a schematic, side view of the example aircraft 100 of FIGS. 1-2 illustrating the example first plasma packet 202 moving along the first path 210 toward the first sensor array 118. The example first sensor array 118 may be used to determine a direction and/or velocity of an updraft and/or a downdraft, an angle of attack and/or airspeed of the example aircraft 100.

A velocity of the first plasma packet 202 in an aft direction relative to the aircraft 100 (e.g., a direction parallel to the roll axis 130) is a function of a velocity of the aircraft 100 relative to rearward or aft moving air, which is referred to herein as a "headwind," and/or forward moving air, which is referred herein as a "tailwind." In the illustrated example, the first plasma packet 202 may move vertically in the orientation of FIG. 3 (e.g., substantially parallel to the yaw axis 134 of the aircraft 100) as a result of an angle of attack of the aircraft 100, upward moving air, which is referred herein as an "updraft," and/or downward moving air, which is referred herein as a "downdraft."

In the illustrated example, the aircraft 100 is flying at a substantially constant or level altitude, and the example first plasma packet 202 of FIG. 3 moves aft and upward relative to the aircraft 100 in the orientation of FIG. 3. Thus, an updraft moves the first plasma packet 202 upward in the illustrated example.

The example first sensor array 118 is arc-shaped (e.g., a circular arc) and extends from a first side 300 of a first axis 302 to a second side 304 of the first axis 302 to enable the first sensor array 118 to detect the first plasma packet 202 if the first sensor array moves in a first direction (e.g., aft) and a second direction (e.g., upward or downward in the orientation of FIG. 3). In other examples the first sensor array 118 is other shapes. In the illustrated example, the first axis 302 is substantially parallel to the roll axis 130. In some examples, the first sensor array 118 has a center of curvature substantially coincident to a location at which the first plasma packet 202 is generated (e.g., where the laser beam passes through the first window 206). In the illustrated example, the first plasma packet 202 is generated adjacent the first window 206 along the first axis 302. Thus, the first plasma packet 202 moves toward and/or across the first sensor array 118 as the first plasma packet 202 moves aft and vertically relative to the aircraft 100.

An airspeed of the aircraft 100 may be determined based on a velocity of the first plasma packet 202. In some examples, the velocity of the first plasma packet 202 is determined based on an amount of time between generation of the first plasma packet 202 (e.g., when the laser beam is transmitted) adjacent the first window 206 and detection of the first plasma packet 202 at a given location (e.g., along the first sensor array 118). In some examples, an absolute value of the velocity of the first plasma packet 202 is the airspeed of the example aircraft 100.

In some examples, a vertical component of the velocity of the first plasma packet 202 corresponds to a velocity of an updraft or a downdraft. In some examples, the vertical component of the velocity of the first plasma packet 202 is determined based on the location along the first sensor array 118 where the first plasma packet 202 is detected. For example, the location at which the first sensor array 202 detects the example first plasma packet 202 may be determined based on amount of vertical movement of the first plasma packet 202 between the first window 206 and the first sensor array 118. In some examples, the amount of vertical movement is determined in units of degrees or radians from the first axis 302 to the location at which the first plasma packet 202 is generated. Based on the amount of vertical movement and the velocity of the first plasma packet 202, the vertical component of the velocity of the first plasma packet 202 and, thus, the velocity of the updraft or the downdraft may be determined.

In some examples, the location at which the first plasma packet 220 is detected along the first sensor array 118 is determined by detecting a center or middle of the first plasma packet 202. For example, the center or middle of the first plasma packet 202 may be determined based on a median or average location at which the first plasma packet 202 is detected along the first sensor array 118.

In some examples, a temperature of the air is determined based on a size of the first plasma packet 202. The size and/or a rate of growth or expansion of the first plasma packet 202 may be affected and/or influenced by the temperature of the air. In the illustrated example, the size of the first plasma packet 202 increases (e.g., the first plasma packet 202 expands) as the first plasma packet 202 moves along the first path 210. During operation of the example aircraft 100, the size of the first plasma packet 202 when the first plasma packet 202 is within the sensing range of the first sensor array 202 may be determined based on the locations at which the first plasma packet 202 is detected along the first sensor array 118. For example, if the first plasma packet 202 is detected along the sensor array 118 from a first location 306 to a second location 308, a distance between the first location 306 and the second location 308 may substantially equal a dimension (e.g., a diameter) of the first plasma packet 202.

The size of the first plasma packet 202 may be associated with the temperature of the air based on experimentally determined sizes of a plurality of plasma packets generated in air at different temperatures. In some examples, the plasma packets are generated via a laser similar or identical to the example first laser 200 of FIG. 2. The experimentally determined sizes and the temperatures associated with the experimentally determined sizes may be stored in a database or memory. If the size of the first plasma packet 202 substantially matches an experimentally determined size or falls within a range of experimentally determined sizes, the temperature of the air may be determined to be the temperature associated with the experimentally determined size or the experimentally determined range of sizes.

Figure 4:
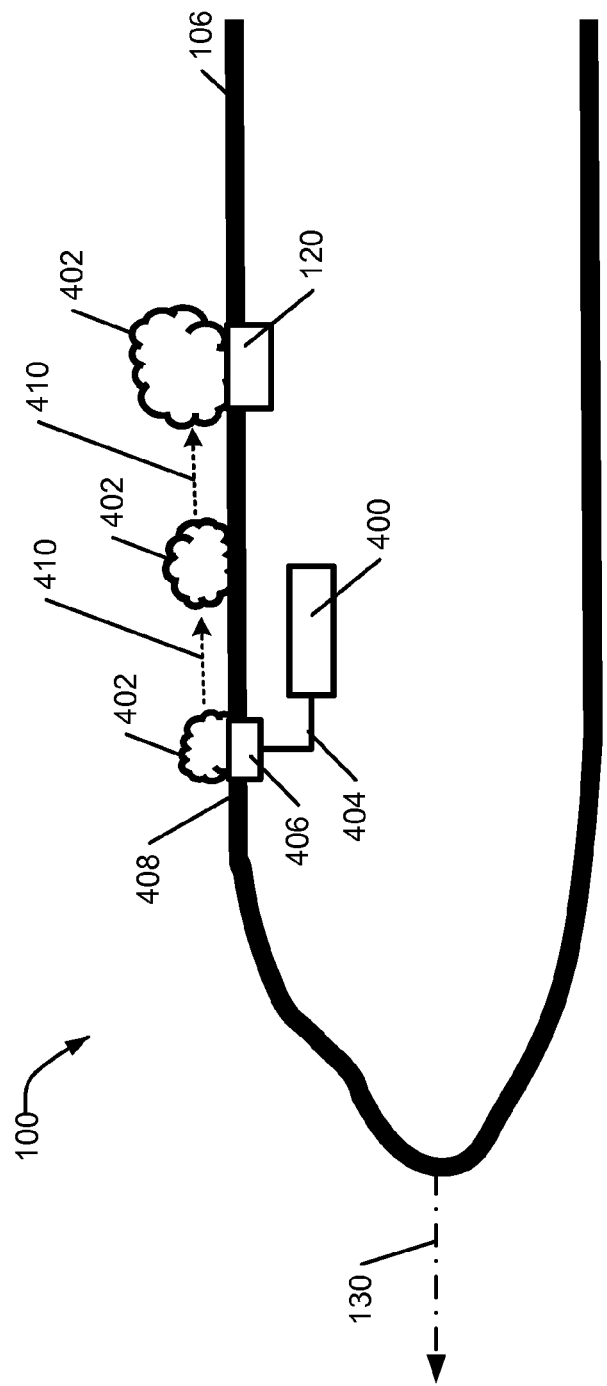
FIG. 4 is a cross-sectional view of the example aircraft of FIGS. 1-3 along line B-B of FIG. 2 illustrating a second example ionizer generating a second gaseous packet adjacent the aircraft.

FIG. 4 is a schematic, cross-sectional side view of the example aircraft 100 along line B-B of FIG. 2. The example aircraft 100 includes a second laser 400. In the illustrated example, the second laser 400 produces and/or outputs a laser beam that ionizes air outside the aircraft 100 adjacent the fuselage 102 to form a second plasma packet 402. In the illustrated example, a second fiber bundle 404 directs the laser beam output by the second laser 400 from inside the fuselage 102 through a second optical window 406 to outside the aircraft 100. The example second fiber bundle 404 includes one or more optical fibers. In some examples, optics (e.g., lenses, filters and/or any other optics) direct and/or focus the laser beam from the second laser 400 onto the second fiber bundle 404 and/or from the second fiber bundle 404 through the second window 406. In the illustrated example, the second window 406 is substantially flush with a second aerodynamic surface 408 (e.g., a skin) of the fuselage 102. Some examples do not include the second window 406. For example, the laser beam may be output via an aperture or opening of the second aerodynamic surface 408. In some examples, the aircraft 100 does not include the second laser 400, and the first laser 200 outputs a first laser beam through the first window 206 and a second laser beam through the second window 406.

The example second sensor array 120 is disposed aft of the window 406 along a second path 410 of the second plasma packet 402. The example second sensor array 120 of FIG. 4 detects the second plasma packet 402 when the second plasma packet 402 is in a sensing range of the second sensor array 120. In the illustrated example, the second sensor array 120 is substantially identical to the first sensor array 118. In other examples, the second sensor array 120 is different than the first sensor array 118. For example, the second sensor array 120 may have a different sensing range than the first sensor array 118, the second sensor array 120 may have a different number of sensors than the example first sensor array 118, etc.

In the illustrated example, the second sensor array 120 is disposed on the example aircraft 100 such that the second sensor array 120 is substantially flush with the second aerodynamic surface 408 of the fuselage 102. In the illustrated example, the second sensor array 120 is disposed about ten centimeters from a location (e.g., a point and/or an area) at which the second plasma packet 402 is generated. In the illustrated example, the second plasma packet 402 is generated adjacent the second window 406 (e.g., where the laser beam passes through the second window 406). In other examples, the second sensor array 120 is other distances from the second window 406 and/or the location at which the second plasma packet 402 is generated.

Figure 5:
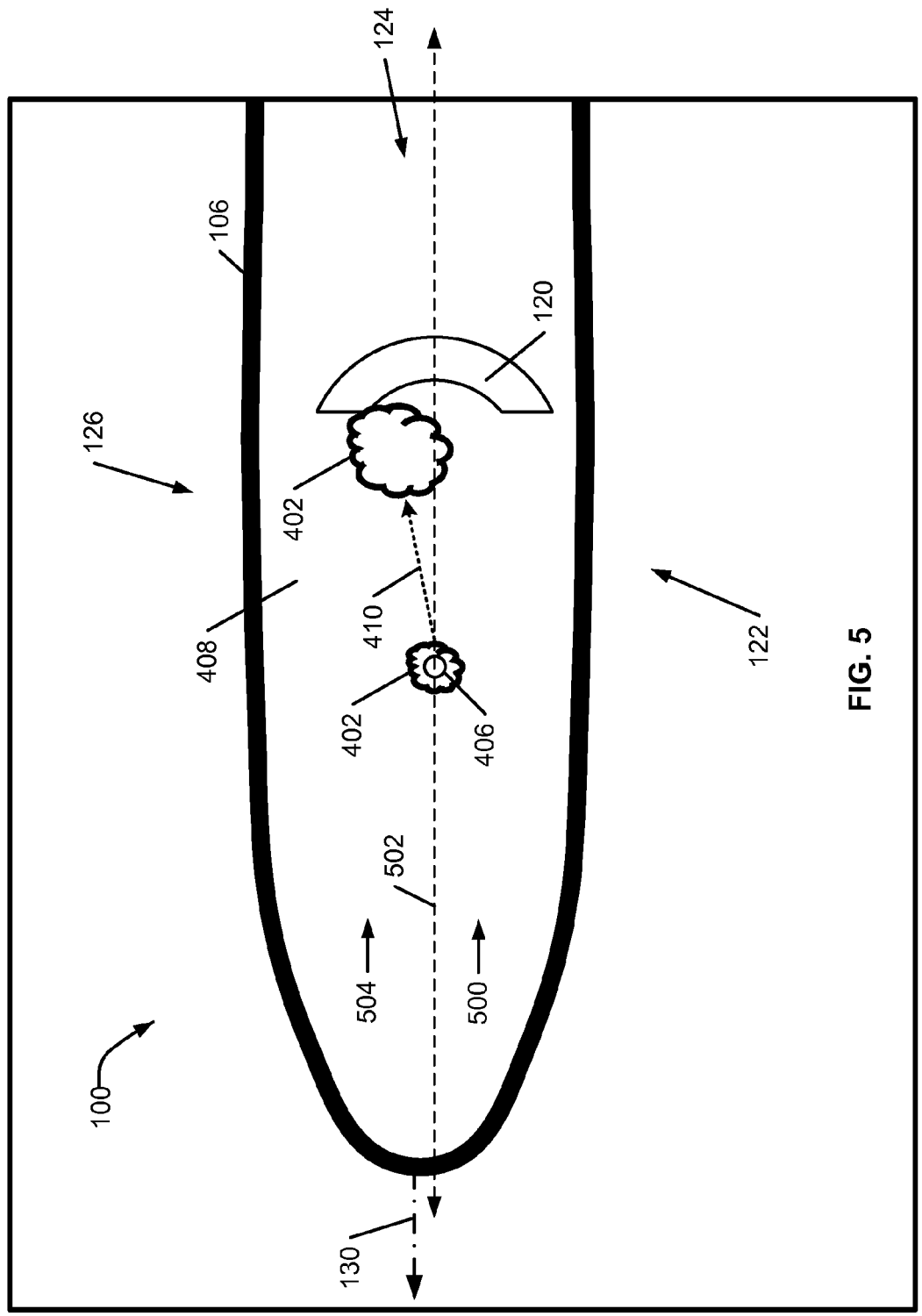
FIG. 5 is a top view illustrating an example second path of the second gaseous packet of FIG. 4 across a second example sensor array disclosed herein.

FIG. 5 is a schematic, top view of the example aircraft 100 of FIGS. 1-4. In the illustrated example, the second sensor array 120 is disposed on the upper side 124 of the fuselage 102. The example second sensor array 120 is arc-shaped (e.g., curved, circular, etc.) and extends spanwise (e.g., from a first side 500 of a second axis 502 to a second side 504 of the second axis 502) along the fuselage 102. In the illustrated example, the second axis 502 is substantially parallel to the roll axis 130. In some examples, the second sensor array 120 has a center of curvature substantially coincident to the location at which the second plasma packet 402 is generated. In the illustrated example, the second plasma packet 402 is generated adjacent the window 206 along the second axis 502. Thus, the example second sensor array 120 may be used to detect sideways movement of the second plasma packet 402 (e.g., movement parallel to the pitch axis 132 of the aircraft 100). Based on the sideways movement of the second plasma packet 402, a direction and/or velocity of air moving sideways, which is referred herein as a "sidedraft," may be determined.

An airspeed of the aircraft 100 may be determined based on a velocity of the second plasma packet 402. In some examples, the velocity of the second plasma packet 402 is determined based on an amount of time between generation of the second plasma packet 402 (e.g., when the laser beam is transmitted via the second laser 400) adjacent the second window 406 and detection of the second plasma packet 402 at a given location (e.g., on and/or over the second sensor array 120). In some examples, an absolute value of the velocity of the second plasma packet 402 is the airspeed of the example aircraft 100.

In some examples, a sideways component of the velocity of the first plasma packet 202 corresponds to a velocity of a sidedraft. In some examples, the sideways component of the velocity of the second plasma packet 402 is determined based on the location along the second sensor array 120 where the second plasma packet 402 is detected. For example, the location at which the second sensor array 402 detects the example second plasma packet 42 may be determined based on amount of sideways movement of the second plasma packet 402 between the second window 406 and the second sensor array 120. In some examples, the amount of sideways movement is determined in units of degrees or radians from the second axis 502 relative to the location at which the second plasma packet 402 is generated. Based on the amount of sideways movement and the velocity of the second plasma packet 402, the sideways component of the velocity of the second plasma packet 402 and, thus, the velocity of the sidedraft may be determined.

In some examples, the location at which the second plasma packet 402 is detected along the second sensor array 120 is determined based on a location at which a center or middle of the second plasma packet 402 moves across the second sensor array 120. For example, the center or middle of the second plasma packet 402 may be determined based on a median or average location at which the second plasma packet 402 is detected along the second sensor array 120.

In some examples, flight control mechanisms of the aircraft 100 are adjusted based on one or more of the flight conditions determined based on detection of the first plasma packet 202 and/or the second plasma packet 402. For example, thrust provided by one or more engines on the aircraft 100 may be increased or decreased, a flight control surface (e.g., an aileron, an elevator, a rudder, a spoiler, a flap, a slat, trim, etc.) may be moved, and/or any other flight control mechanism(s) may be adjusted. In some examples, the flight control mechanisms are adjusted to adjust and/or substantially maintain a heading of the aircraft 100, minimize and/or decrease turbulence or slip, increase fuel efficiency, conserve fuel, manage (e.g., reduce and/or or minimize) loads applied to the aircraft 100, and/or control other aspects of the aircraft 100.

Figure 6:
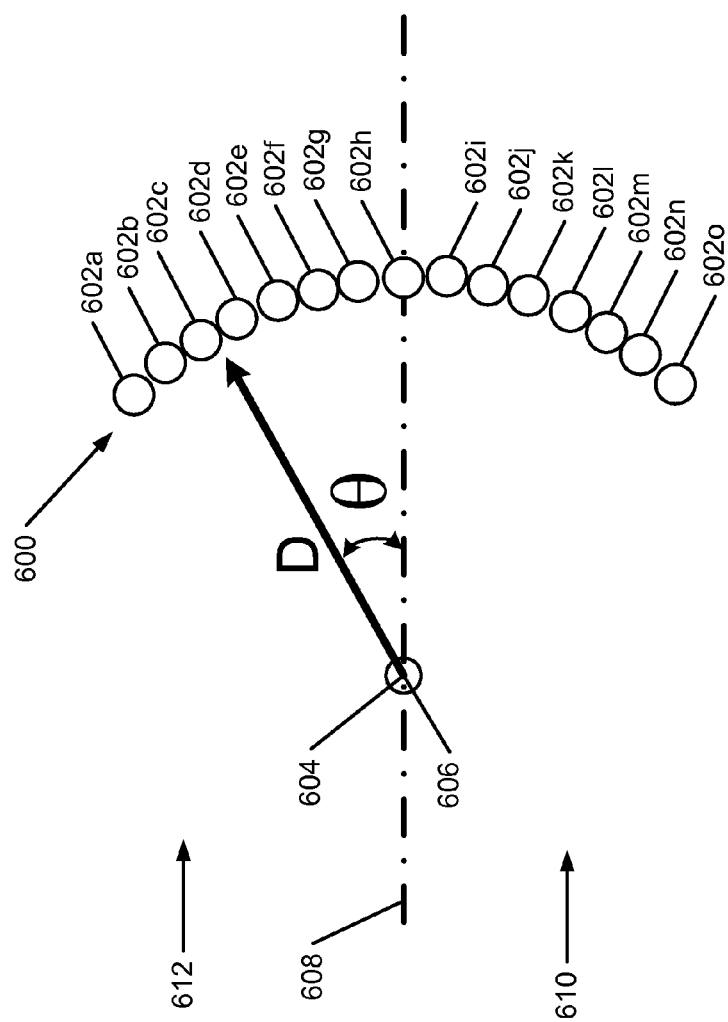
FIG. 6 illustrates an example sensor array disclosed herein, which may be used to implement the example first sensor array of FIG. 3 and/or the example second sensor array of FIG. 5.

FIG. 6 is a schematic of an example sensor array 600, which may be used to implement the example first sensor array 118 and/or the example second sensor array 120 of FIGS. 1-5. The schematic of FIG. 6 is not to scale. The example sensor array 600 may be disposed on an aircraft to detect a gaseous packet such as, for example, a puff of smoke, a plasma packet, and/or any other gaseous packet. In the illustrated example, the sensor array 600 includes fifteen sensors 602a-602o. In other examples, the sensor array 600 includes other numbers of sensors (e.g., 1, 2, 3, 4, 10, 20, 30, and/or any other number of sensors). In some examples, the sensors 602a-602o are electromagnetic sensors such as, for example, capacitive sensors, microphones, and/or any other type of sensor. The above-noted sensors are merely examples and, thus, other sensors may be used without departing from the scope of this disclosure.

The example sensors 602a-602o are disposed in an arc-shaped pattern. In the illustrated example, the sensors 602a-602o are disposed in a circular arc. A center of curvature 604 of the example sensor array 600 is substantially coincident to a first location 606 (e.g., an area or point) at which gaseous packets are generated. Thus, in the illustrated example, each of the sensors 602a-602o is a distance D from the first location 606. In some examples, the distance D is ten centimeters.

In other examples, the distance D is other distances. In some examples, the sensor array 600 of FIG. 6 extends across (e.g., intersects) an axis 608 that is substantially parallel to a roll axis (e.g., the roll axis 130 of FIG. 1) or a pitch axis (e.g., the pitch axis 132 of FIG. 1) of the aircraft.

When a gaseous packet (e.g., the example first plasma packet 202, the example second plasma packet 402, etc.) is generated, the gaseous packet moves relative to an aircraft and is detected by one or more of the example sensors 602a-602o. A velocity of the gaseous packet may be determined using the following equation:

$$V = \frac{D}{\Delta t}.$$ Equation 1

In equation 1, D is the distance between each of the sensors 602a-602o and the first location 606, and $\Delta t$ is an amount of time between the generation of the gaseous packet (e.g., when the first laser 200 is fired, when the second laser 400 is fired, when a spark plug emits an electrical arc, etc.) and detection of the gaseous packet by the sensor array 600 at a second location (e.g., along the sensor array 600). An absolute value of the velocity V of the gaseous packet is substantially equal to an airspeed of an aircraft (e.g., the aircraft 100 of FIGS. 1-5). In some examples, gaseous packets are periodically generated and detected by the sensor array 600. Based on the velocities of the gaseous packets, a profile (e.g., a list, a graph, etc.) of the airspeed of the aircraft 100 may be generated.

In some examples, the velocity V of the gaseous packet has a first directional component and a second directional component. The first directional component corresponds to a portion of the velocity of the gaseous packet in an aft direction. The second directional component corresponds to a portion of the velocity of the gaseous packet in a direction perpendicular to the axis 608 (e.g., a velocity of an updraft, a downdraft and/or a sidedraft). In some examples, the first directional component of the velocity V of the gaseous packet is determined using the following equation:

$$V_x = V \cos \theta.$$ Equation 2

In equation 2, $V_x$ is the velocity of the gaseous packet in an aft direction, and $\theta$ is an angle relative to the first location 606 at which the gaseous packet is generated between the axis 608 and a second location along the sensor array 120 at which the gaseous packet is detected. In the illustrated example, the angle $\theta$ is determined based on which of the sensors 602-602o detected the gaseous packet. For example, each of the sensors 602a-602o may be associated with a given angle from the first location 606. If one of the sensors 602a-602o detects the gaseous packet, the angle $\theta$ is the angle associated with the one of the sensors 602a-602b. In some examples, if two or more of the sensors 602a-602o detect the gaseous packet, the angle $\theta$ is an average of the two or more angles associated with the two or more sensors 602a-602o. For example, if three of the sensors 602a-602o detect the gaseous packet and are associated with angles of 30 degrees, 25 degrees and 20 degrees, respectively, it is determined that the angle $\theta$ is 25 degrees. Other examples employ other techniques to determine the angle $\theta$. In some examples, an angle of attack of the aircraft may be determined based on an orientation of a chord of a wing of the aircraft relative to the angle $\theta$.

In some examples, the second directional component of the velocity V may be determined using the following equation:

$$V_z = V \sin \theta.$$ Equation 3

In equation 3, $V_z$ is the velocity of the gaseous packet in a direction parallel to a yaw axis (e.g., the yaw axis 134 of FIG. 1) or a pitch axis (e.g., the pitch axis 132 of FIG. 1), and $\theta$ is the angle between the axis 608 and the second location along the sensor array 600 with respect to the first location 606. Based on the first directional component and/or the second directional component of the velocity of the gaseous packet, the example sensor array 600 may be used to determine a velocity and/or a wind heading relative to the aircraft (e.g., a direction of an updraft, a downdraft or a sidedraft).

In some examples, a temperature of the air is determined based on a size of the gaseous packet. The size and/or a rate of growth or expansion of the gaseous packet may be affected and/or influenced by the temperature of the air. The size of the gaseous packet when the first gaseous packet is within the sensing range of the sensor array 600 may be determined based on which of the sensors 602a-o detect the gaseous packet. For example, if the gaseous packet is detected by sensors 602b-602g, a dimension (e.g., a diameter) of the gaseous packet may be determined to be a distance between the sensor 602b and the sensor 602g.

Figure 7:
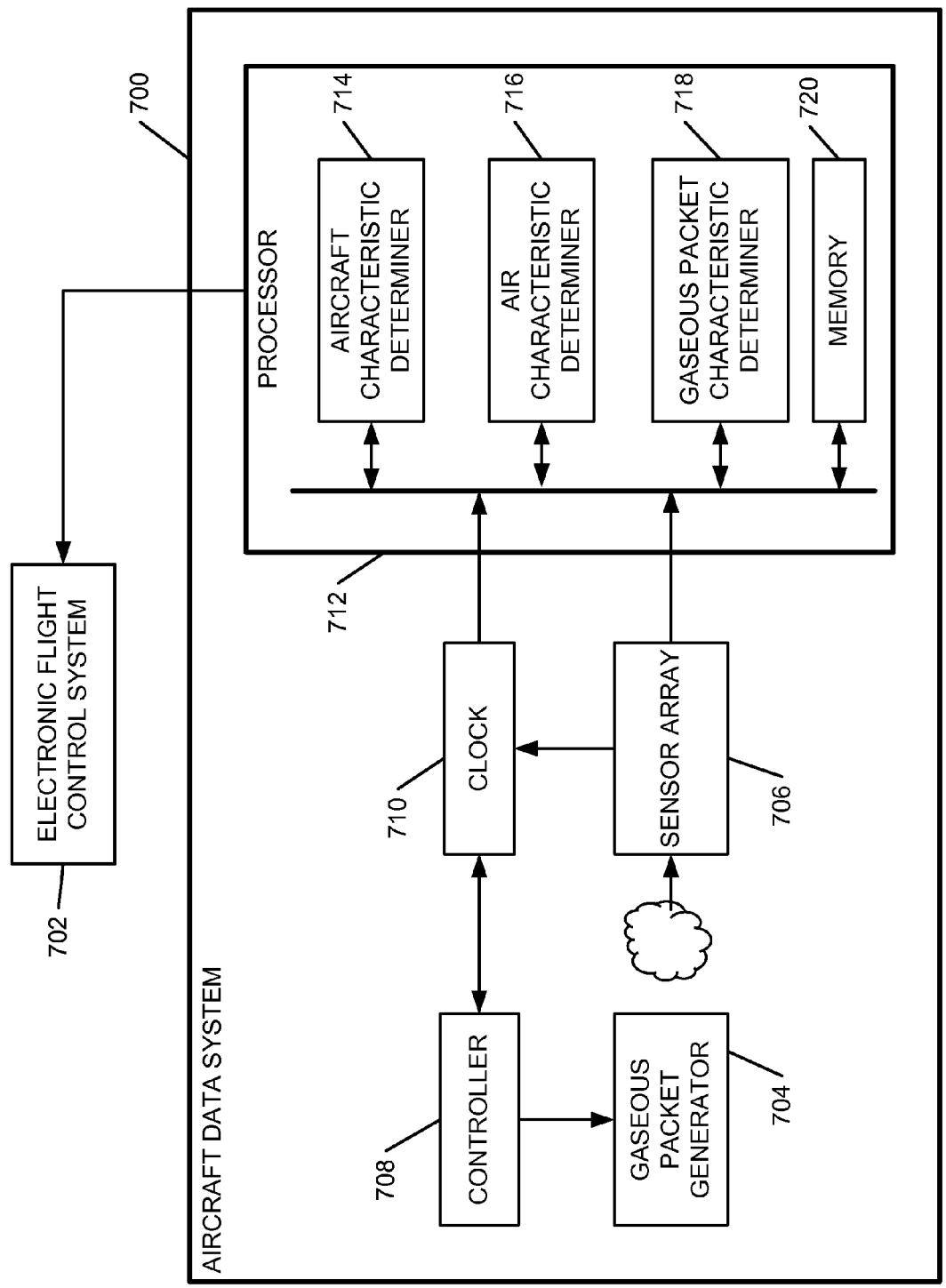
FIG. 7 is a block diagram of an example aircraft data system in accordance with the teachings of this disclosure.

FIG. 7 is a block diagram representative of an example aircraft data system 700 communicatively coupled to an electronic flight control system 702. The example aircraft data system 700 may be used to determine one or more flight conditions of an aircraft (e.g., the example aircraft 100 of FIG. 1). For example, the aircraft data system 700 of FIG. 7 may be used to determine a velocity of air flowing along the aircraft, a direction of movement of the air relative to the aircraft, a temperature of the air surrounding the aircraft, an airspeed of the aircraft, an angle of attack of the aircraft and/or other information. The example aircraft data system 700 of FIG. 7 includes a gaseous packet generator 704, a sensor array 706, a controller 708, a clock 710, and a processor 712. The example processor 712 includes an aircraft characteristic determiner 714, an air characteristic determiner 716, a gaseous packet characteristic determiner 718 and a memory 720.

The example gaseous packet generator 704 generates one or more gaseous packets outside or outboard the aircraft. In some examples, the gaseous packet generator 704 is an ionizer (e.g., one or more lasers, spark plugs, and/or other ionizer(s)) that generates plasma packets. In some examples, the gaseous packet generator 704 generates puffs of smoke and/or any other gaseous packet. In some examples, the gaseous packet generator is disposed inside the aircraft.

The example controller 708 controls operation of the example gaseous packet generator 704. For example, the controller 708 may provide power to the gaseous packet generator 704 and/or energize the gaseous packet generator 704 to enable the gaseous packet generator 704 to generate the gaseous packets. In some examples, the controller 708 controls a duty cycle of the gaseous packet generator 704 and/or a frequency at which the gaseous packet generator 704 generates gaseous packets. For example, the controller 708 may receiving timing information from the clock 710 and periodically communicate a command and/or transmit power to the gaseous packet generator 704 based on the timing information.

The example sensor array 706 detects the gaseous packets as the gaseous packets move relative to the aircraft. In some examples, the sensor array 706 includes one or more sensors such as, for example, capacitive sensors, microphones and/or any other sensors. The sensor array 706 acquires and/or generates information related to the gaseous packets such as, for example, capacitances between the sensor array 706 and the gaseous packets, characteristics of sonic waves produced by the gaseous packets and/or other information.

In some examples, the sensors are disposed in an arc-shaped pattern. In some examples, the sensor array includes a plurality of rows (e.g., concentric arcs) disposed along a path of the gaseous packets to enable the sensor array 706 to detect the gaseous packets as the gaseous packets moves along the aircraft. In some examples, the sensor array 706 is disposed on an aerodynamic surface of the aircraft such that the sensor array 706 is substantially flush with the aerodynamic surface. Thus, in some examples, because the gaseous packet generator 704 is disposed inside the aircraft and the sensor array 706 is substantially flush with the aerodynamic surface, the example aircraft data system 700 does not include any components that disrupt an airfoil of the aircraft.

The example clock 710 generates timing information, which may be used by the controller 708 to control operation of the example gaseous packet generator 704. The example timing information may also be used by the example processor 712 to determine a velocity of the gaseous packet. In some examples, the clock employs timing information provided by a global positioning system (GPS).

The example processor 712 of FIG. 7 processes information related the gaseous packets to determine one or more characteristics of the gaseous packet, the aircraft and/or the air flowing along the aircraft. In some examples, gaseous packet characteristic determiner 718 determines a size of the gaseous packet. For example, the gaseous packet characteristic determiner 718 determines two or more locations along the sensor array 706 at which the sensor array 706 detects the gaseous packet. In some examples, the gaseous packet characteristic determiner 718 determines a dimension (e.g., a diameter) of the gaseous packet based on a distance between the two locations. In some examples, the gaseous packet characteristic determiner 718 determines the size of the gaseous packet based on other information related to the gaseous packet such as, for example, a capacitance between the sensor array 706 and the gaseous packet, a characteristic of one or more sonic waves generated by the gaseous packet and/or other information.

In some examples, the example air characteristic determiner 716 determines a temperature of the air flowing along the aircraft based on a size of the gaseous packet. In some examples, the memory 720 stores a table or database including air temperatures associated with experimentally determined sizes of gaseous packets. In some examples, the air characteristic determiner 716 determines the temperature of the air by matching the size of the gaseous packet to an experimentally determined size or a range of experimentally determined sizes, and determining the temperature associated with the experimentally determined size or the range of experimentally determined sizes.

The example gaseous packet characteristic determiner 718 uses timing information generated by the clock 710 and parameters of the aircraft data system 700 stored in the memory 720 to determine a velocity of the gaseous packet relative to the aircraft. For example, the gaseous packet characteristic determiner 718 determines an amount of time between a first time when the gaseous packet generator 704 generates the gaseous packet at a first location and a second time when the gaseous packet is detected at a second location aft of the first location (e.g., on and/or over the sensor array 706). In some examples, a distance between the first location and the second location is retrieved from the memory 720. Based on the amount of time between the first time and the second time and the distance between the first location and the second location, the gaseous packet characteristic determiner 718 determines the velocity of the gaseous packet relative to the aircraft. In some examples, the gaseous packet characteristic determiner 718 determines a direction of movement of the gaseous packet based on the velocity of the gaseous packet and the second location. In some examples, the gaseous packet characteristic determiner 718 determines the direction of movement in units of degrees using, for example, Equations 2 and/or 3 described above.

In some examples, the air characteristic determiner 716 determines a velocity of an updraft, a downdraft and/or a sidedraft flowing along the aircraft. For example, based on the second location and/or the velocity of the gaseous packet, a direction and a speed of the updraft, the downdraft and/or the sidedraft may be determined. For example, a vertical component of the velocity of the gaseous packet may substantially correspond to a velocity of the updraft.

In some examples, the aircraft characteristic determiner 714 determines an airspeed of the aircraft by determining an absolute value of the velocity of the gaseous packet. In some examples, based on the direction of movement of the gaseous packet, the aircraft characteristic determiner 714 determines an angle of attack of the aircraft (e.g., an angle between a direction of airflow along the aircraft and a chord of a wing).

The example electronic flight control system 702 adjusts one or more flight control mechanisms of the aircraft based on the airspeed of the aircraft, the velocity of the air, the vertical component of the velocity, the sideways component of the velocity, a direction of movement of the air and/or other flight conditions. For example, thrust provided by one or more engines on the aircraft may be increased or decreased, a flight control surface (e.g., an aileron, an elevator, a rudder, a spoiler, a flap, a slat, trim, etc.) may be moved, and/or any other flight control mechanism may be adjusted. In some examples, the flight control mechanisms are adjusted to substantially maintain a heading of the aircraft, decrease turbulence or slip, increase fuel efficiency, conserve fuel, manage loads applied to the aircraft, and/or to control other flight characteristics of the aircraft.

While an example manner of implementing the aircraft data system 700 of FIG. 7 is illustrated in FIG. 7, one or more of the elements, processes and/or devices illustrated in FIG. 7 may be combined, divided, re-arranged, omitted, eliminated and/or implemented in any other way. Further, the example gaseous packet generator 704, the example sensor array 706, the example controller 708, the example clock 710, the example processor 712, the example aircraft characteristic determiner 714, the example air characteristic determiner 716, the example air temperature determiner 718, the example memory 720, the example electronic flight control system 702 and/or, more generally, the example aircraft data system 700 of FIG. 7 may be implemented by hardware, software, firmware and/or any combination of hardware, software and/or firmware. Thus, for example, any of the example gaseous packet generator 704, the example sensor array 706, the example controller 708, the example clock 710, the example processor 712, the example aircraft characteristic determiner 714, the example air characteristic determiner 716, the example air temperature determiner 718, the example memory 720, the example electronic flight control system 702 and/or, more generally, the example aircraft data system 700 of FIG. 7 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example gaseous packet generator 704, the example sensor array 706, the example controller 708, the example clock 710, the example processor 712, the example aircraft characteristic determiner 714, the example air characteristic determiner 716, the example air temperature determiner 718, the example memory 720, the example electronic flight control system 702 and/or, more generally, the example aircraft data system 700 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example aircraft data system 700 of FIG. 7 may include one or more elements, processes and/or devices in addition to, or instead of, those illustrated in FIG. 7, and/or may include more than one of any or all of the illustrated elements, processes and devices.

Figure 8:
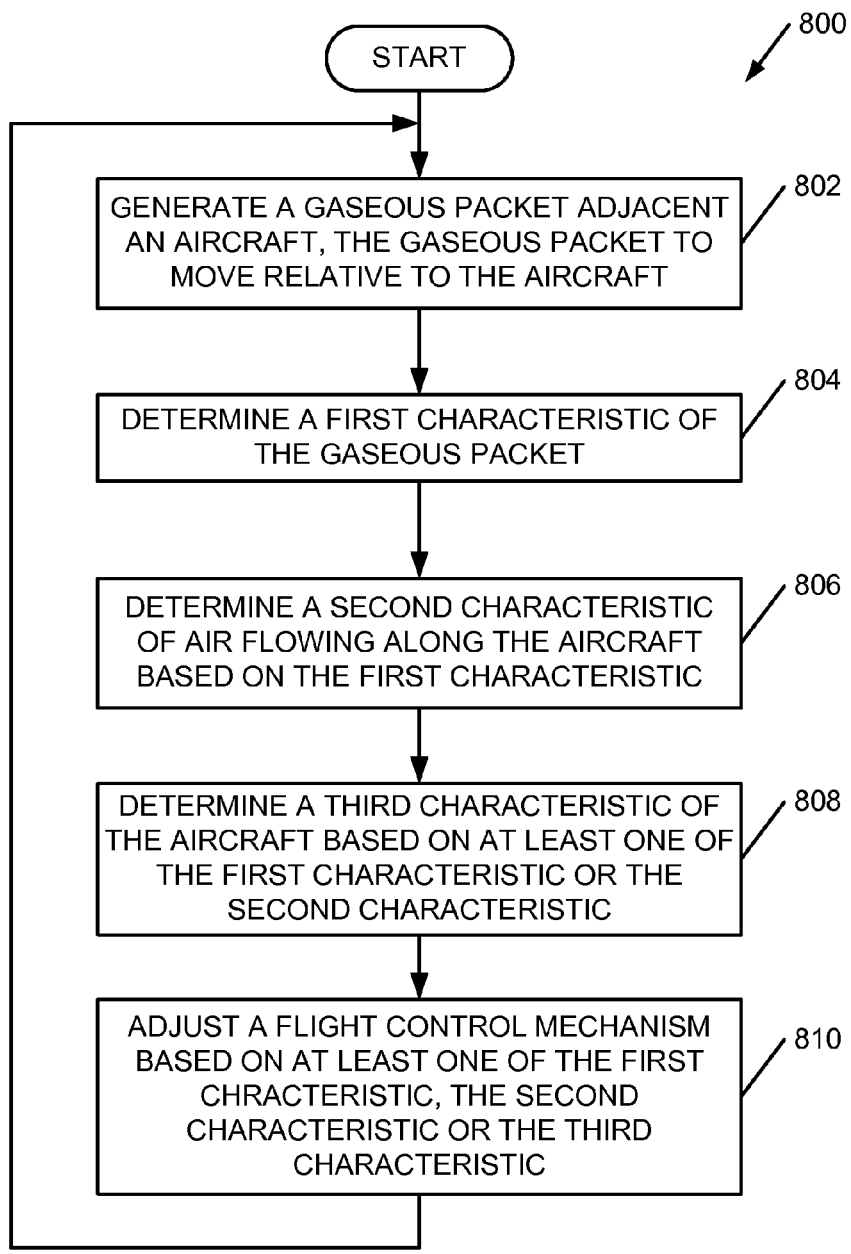
FIG. 8 is a flowchart representative of another example method in accordance with the teachings of this disclosure.

A flowchart representative of an example method that may be used to implement the air flow data system 700 of FIG. 7 is shown in FIG. 8. In this example, the method may be implemented using the machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example aircraft data system 700 may alternatively be used. For example, the order of execution of the blocks may be changed, and/or some of the blocks described may be changed, eliminated, or combined.

As mentioned above, the example method of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example method of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The example method 800 of FIG. 8 begins at block 802 with the gaseous packet generator 704 generating a gaseous packet adjacent an aircraft (e.g., the example aircraft 100 of FIG. 1). The gaseous packet moves relative to the aircraft. For example, the aircraft may be flying at a speed greater than a speed at which air adjacent the aircraft (e.g., a tailwind) is moving the gaseous packet. In some examples, the air adjacent the aircraft (e.g., an updraft, a downdraft and/or a sidedraft) moves the gaseous packet in a direction different than a direction of travel of the aircraft.

In some examples, the controller 708 controls a duty cycle of the gaseous packet generator 704 and/or a frequency at which the gaseous packet generator 704 generates gaseous packets. In some examples, the gaseous packet generator 704 is an ionizer (e.g., the example first laser 200, the example second laser 400, a spark plug and/or any other ionizer), and the ionizer ionizes air outside of the aircraft to generate a plasma packet. As the aircraft moves relative to the gaseous packet, the sensor array 706 detects the gaseous packet and/or acquires information related to the gaseous packet.

At block 804, the gaseous packet characteristic determiner 718 of the processor 712 determines a first characteristic of the gaseous packet. In some examples, the gaseous packet characteristic determiner 718 determines a size of the gaseous packet. In some examples, the gaseous packet characteristic determiner 718 determines a velocity of the gaseous packet based on an amount of time between generation of the gaseous packet at a first location and detection of the gaseous packet at a second location relative to the aircraft. In some examples, the gaseous packet characteristic determiner 718 determines a direction of movement (e.g., a heading) of the gaseous packet relative to the aircraft based on, for example, one or more locations along the sensor array 704 where the gaseous packet is detected. In other examples, the gaseous packet characteristic determiner 718 determines other characteristics of the gaseous packet.

At block 806, the air characteristic determiner 716 determines a second characteristic of air flowing along the aircraft based on the first characteristic. In some examples, the air characteristic determiner 716 determines a temperature of the air based on the size of the gaseous packet. In some examples, air characteristic determiner 716 determines a velocity of the air based on the velocity of the plasma packet. For example, if the gaseous packet moves toward a right side or a left side of the aircraft, air characteristic determiner 716 may determine a speed and a direction of a sidedraft flowing along the aircraft.

At block 808, the aircraft characteristic determiner 714 determines a third characteristic of the aircraft based on at least one of the first characteristic of the gaseous packet or the second characteristic of the air. For example, an airspeed of the aircraft may be determined based on an absolute value of the velocity of the gaseous packet. In some examples, based on the direction of movement of the gaseous packet and/or the air, the aircraft characteristic determiner 714 determines an angle of attack of the aircraft (e.g., an angle between a direction of flow of the air and a chord line of a wing of the aircraft).

At block 810, the electronic flight control system 702 adjusts a flight control mechanism based on at least one of the first characteristic, the second characteristic or the third characteristic. For example, thrust provided by one or more engines on the aircraft may be increased or decreased, a flight control surface (e.g., an aileron, an elevator, a rudder, a spoiler, a flap, a slat, trim, etc.) may be moved, and/or any other flight control mechanism(s) may be adjusted. In some examples, the flight control mechanism is adjusted to adjust an airspeed of the aircraft, substantially maintain or adjust a heading of the aircraft, decrease and/or minimize turbulence or slip, increase fuel efficiency, conserve fuel, manage (e.g., decrease and/or minimize) loads applied to the aircraft, and/or to control other flight characteristics of the aircraft.

Figure 9:
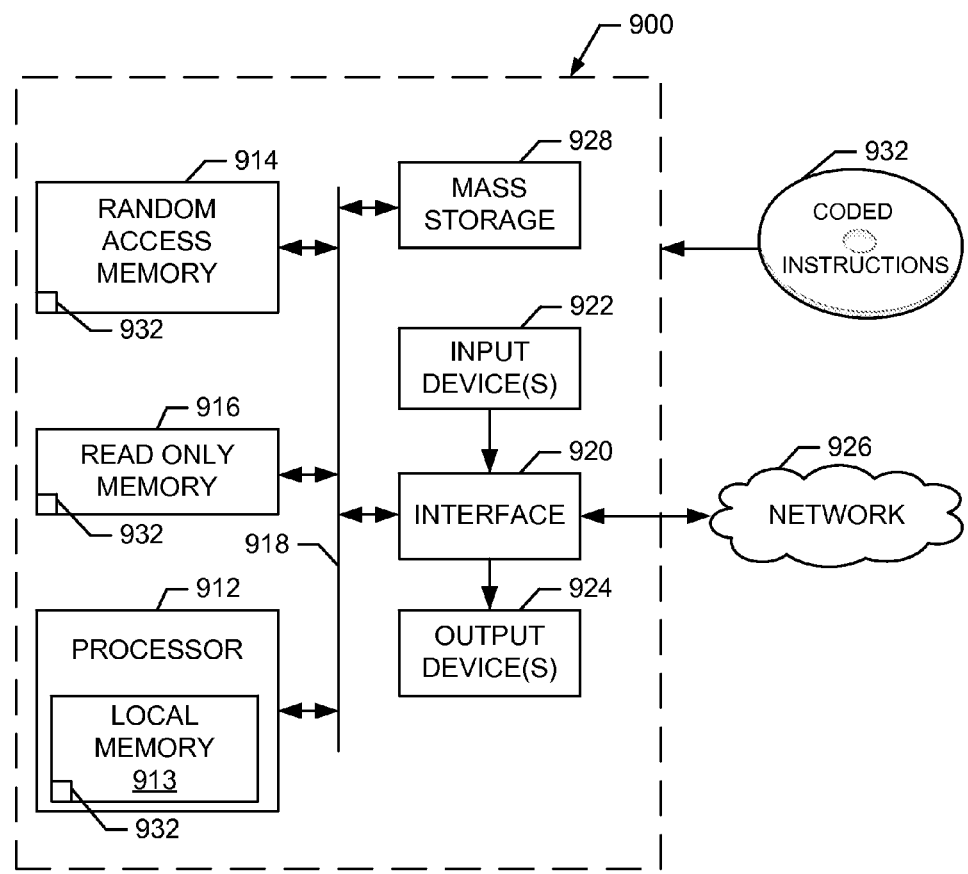
FIG. 9 is a block diagram of an example processor platform capable of executing the example method of FIG. 8.

FIG. 9 is a block diagram of an example processor platform 900 capable of executing the example method 800 of FIG. 8 to implement the example aircraft data system 700 of FIG. 7. The processor platform 900 can be, for example, a server, a flight control computer, a mobile device (e.g., a cell phone, a smart phone, a tablet such as an iPad™), or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a cockpit instrument (e.g., a gauge and/or indicator) a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the method 800 of FIG. 8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture enable characteristics of an aircraft and/or air flowing along the aircraft to be determined using solid state devices that are not obtrusive to an airfoil of the aircraft. Thus, the examples disclosed herein are less susceptible to damage from debris that may contact the aircraft during flight than traditional devices used to determine airspeed and/or other flight conditions. The examples disclosed herein may also have a longer useful life and/or require less maintenance than traditional devices, which generally include one or more moving parts.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a gaseous packet generator to generate a gaseous packet adjacent an aircraft;
   a sensor array disposed on the aircraft to acquire information related to the gaseous packet; and
   a processor to determine at least one of a first characteristic of air flowing along the aircraft or a second characteristic of the aircraft based on the information, wherein the first characteristic of air includes a temperature of the air.

2. The apparatus of claim 1, wherein the gaseous packet generator comprises an ionizer disposed inside the aircraft.

3. The apparatus of claim 2, further comprising an optical fiber to direct a laser beam of the ionizer from inside the aircraft to outside the aircraft.

4. The apparatus of claim 1, wherein the sensor array comprises a capacitive sensor.

5. The apparatus of claim 1, wherein the sensor array includes a plurality of sensors disposed in an arc-shaped pattern.

6. The apparatus of claim 1, wherein the sensor array is coupled to a fuselage of the aircraft.

7. The apparatus of claim 6, wherein the sensor array is to detect the gaseous packet moving along the fuselage.

8. The apparatus of claim 1, wherein the sensor array is substantially flush with a surface of the aircraft.

9. A method, comprising:
   generating a gaseous packet adjacent an aircraft, the gaseous packet to move relative to the aircraft;
   determining a first characteristic of the gaseous packet, wherein determining the first characteristic of the gaseous packet comprises determining a size of a gaseous packet; and
   determining at least one of a second characteristic of air flowing along the aircraft or a third characteristic of the aircraft based on the first characteristic of the gaseous packet, wherein determining the second characteristic of air comprises determining a temperature of the air based on the size of the gaseous packet.

10. The method of claim 9, wherein generating the gaseous packet comprises generating a laser beam.

11. The method of claim 9, wherein determining the first characteristic of the gaseous packet further comprises determining a velocity of the gaseous packet relative to the aircraft.

12. The method of claim 11, wherein determining the third characteristic comprises determining an airspeed of the aircraft based on the velocity of the gaseous packet.

13. The method of claim 9, wherein determining the first characteristic of the gaseous packet further comprises determining a direction of movement of the gaseous packet relative to the aircraft.

14. The method of claim 13 wherein determining the second characteristic of the air further comprises determining a wind heading relative to the aircraft based on the direction of movement of the gaseous packet.

15. The method of claim 9 further comprising adjusting a flight control mechanism of the aircraft based on at least one of the second characteristic or the third characteristic.

16. An apparatus, comprising:
means for generating a gaseous packet adjacent an aircraft;
means for detecting the gaseous packet as the gaseous packet moves relative to the aircraft; and
means for determining at least one of a first characteristic of air flowing along the aircraft or a second characteristic of the aircraft based on detection of the gaseous packet, wherein the means for determining the first characteristic includes determining a temperature of the air.

17. The apparatus of claim 16, wherein the means for generating the gaseous packet comprises means for ionizing the air.

18. The apparatus of claim 16, wherein the means for detecting the gaseous packet comprises first means for detecting the gaseous packet and second means for detecting the gaseous packet, the first means for detecting and the second means for detecting disposed on opposite sides of an axis parallel to a roll axis of the aircraft.

19. The apparatus of claim 1, wherein the gaseous packet generator generates the gaseous packet relative to a longitudinal axis substantially parallel relative to a roll axis of the aircraft.

20. The apparatus of claim 19, wherein the sensor array comprises an arcuate shape, the sensor array extending between a first side of the longitudinal axis and a second side of the longitudinal axis.

21. The apparatus of claim 19, wherein the sensor array comprises a plurality of sensors, and wherein a size of the gaseous packet is determined based on a distance between a first location at which the gaseous packet engages the sensor array and a second location at which the gaseous packet engages the sensor array.

22. The apparatus of claim 21, wherein the first location at which the gaseous packet engages the sensor array is provided by a first sensor of the sensor array and the second location at which the gaseous packet engages the sensor array is provided by a second sensor of the sensor array.

* * * * *